United States Patent [19]
Hardin

[11] 3,935,875
[45] Feb. 3, 1976

[54] PNEUMATICALLY OPERATED FORCE BALANCE TRANSMITTER AND METHOD OF MAKING THE SAME

[75] Inventor: George T. Hardin, Knoxville, Tenn.

[73] Assignee: Robertshaw Controls Company, Richmond, Va.

[22] Filed: Sept. 25, 1974

[21] Appl. No.: 509,010

Related U.S. Application Data

[63] Continuation of Ser. No. 331,337, Feb. 9, 1973, abandoned.

[52] U.S. Cl. .................................. 137/84; 137/85
[51] Int. Cl.² ........................................ G05D 16/00
[58] Field of Search ................. 137/84, 85, 86, 608; 285/137 R, 370

[56] References Cited
UNITED STATES PATENTS

| | | | |
|---|---|---|---|
| 3,008,480 | 11/1961 | Fleming et al. | 137/85 |
| 3,550,621 | 12/1970 | Lansky et al. | 137/608 |
| 3,749,109 | 7/1973 | Rosenfeld et al. | 137/85 |

Primary Examiner—Alan Cohan
Assistant Examiner—Gerald A. Michalsky
Attorney, Agent, or Firm—Candor, Candor & Tassone

[57] ABSTRACT

In a force balance transmitter having a base structure provided with passages therein and a secondary assembly attached thereto that includes a pneumatically operated relay module detachably secured to the secondary assembly and having passages therein, the improvement of a fluid transfer member being disposed between the module and the base structure while interconnecting the passages of the base structure respectively to the passages of the module, the fluid transfer member being carried by the secondary assembly and having means floatingly interconnecting with the passages of the base structure to tend to isolate motion of at least that part of the base structure from the module.

6 Claims, 9 Drawing Figures

PNEUMATICALLY OPERATED FORCE BALANCE TRANSMITTER AND METHOD OF MAKING THE SAME

This is a continuation of application Ser. No. 331,337, filed Feb. 9, 1973 now abandoned.

This invention relates to improved manifolding means for the pneumatic flow in a force balance pneumatically operated transmitter or the like as well as to a method of making such a transmitter or the like.

It is well known that pneumatically operated force balance transmitters have been provided wherein each has structure for rebalancing a secondary lever of a secondary assembly that is moved in response to the changes in the operating conditions of a primary device, such as pressure changes in a pressure differential cell or in a differential pressure transmitter wherein the secondary lever is pivoted in proportion to the pressure differential of the cell or other operating device. Such rebalancing structure senses the pivotal movement of the secondary lever and through relay valve structure causes a rebalance bellows or member to act on the secondary lever to pivot the same back to its balanced condtion as well as supply a pressure signal indicating the force required to rebalance the secondary lever for recording purposes or the like whereby such secondary assembly is adapted to indicate at all times the pressure differential at the pressure differential cell or other operating device.

However, it was found according to the teachings of the copending patent application to Rosenfeld et al., Ser. No. 191,633, filed Oct. 22, 1971 now U.S. Pat. No. 3,749,109, which application is assigned to the same assignee to whom this application is assigned, that when such secondary assembly becomes defective in the field, a highly skilled technician must be utilized to individually test and replace the various parts of the secondary assembly, such as the pilot nozzle, the relay valve structure, and/or the force balancing structure in order to correct the failure thereof. In order to accomplish such repairs in the field, a relatively long "downtime" of this primary device is required because of the complicated and time consuming assembly and disassembly of the secondary assembly during the repair thereof. Alternately, such downtime is reduced by replacing the entire primary device as well as the secondary assembly during such repairs.

Thus, it is a feature of such copending patent application to provide a self-contained relay module unit that is adapted to be simply and readily attached to and detached from the primary device in a least-time-consuming manner while being adapted to accurately act on the secondary lever and rebalance the same.

The base structure of such a transmitter has passage defining means therein which must be interconnected to the passage defining means in the self-contained module and such means for interconnecting the passages of the base structure to the passages of the module must readily permit the module to be readily detached from and attached to the primary device in the aforementioned least-time-consuming manner while still being adapted to accurately act on the secondary lever and rebalance the same.

Accordingly, it is a feature of this invention to provide improved means for interconnecting the passage means of the base structure with the passage means of the module of the transmitter of the aforementioned application, as well as for other desired structure.

In particular, one embodiment of this invention provides a force balance transmitter having a base structure provided with passage means and a secondary assembly attached thereto that includes a pneumatically operated relay module detachably secured to the secondary assembly and having passage means. A fluid transfer member is disposed between the module and the base structure and interconnects the passage means of the base structure to the passage means of the module, the fluid transfer member being carried by the secondary assembly and having means floatingly interconnected with passage means of the base structure to tend to isolate motion of at least that part of the base structure from the module. However, the fluid transfer member is only disposed in abutting relation with the module in such a manner that the passage means of the fluid transfer member are in aligned relation with the passage means of the module and are sealed thereto by annular sealing means disposed in compressed relation between the module and the fluid transfer member whereby the relay module can still be readily removed for the aforementioned replacement purposes.

Accordingly, it is an object of this invention to provide an improved force balance transmitter or the like having one or more of the novel features set forth above or hereinafter shown or described.

Another object of this invention is to provide a method for making a transmitter or the like.

Other objects, uses and advantages of this invention are apparent from a reading of this description which proceeds with reference to the accompanying drawings forming a part thereof and wherein.

Figure 1:
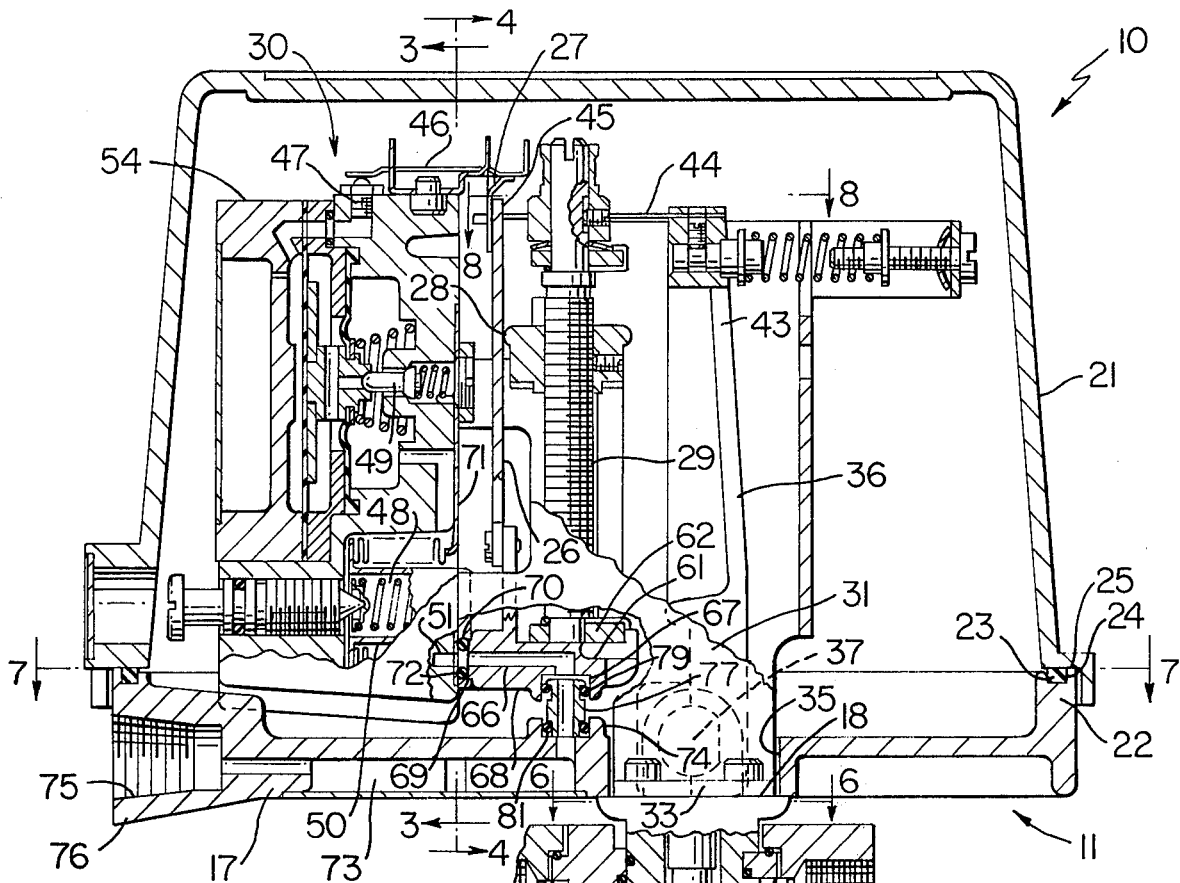
FIG. 1 is a fragmentary, cross-sectional view with certain parts broken away of the improved pneumatically operated force balance transmitter of this invention.
Figure 2:
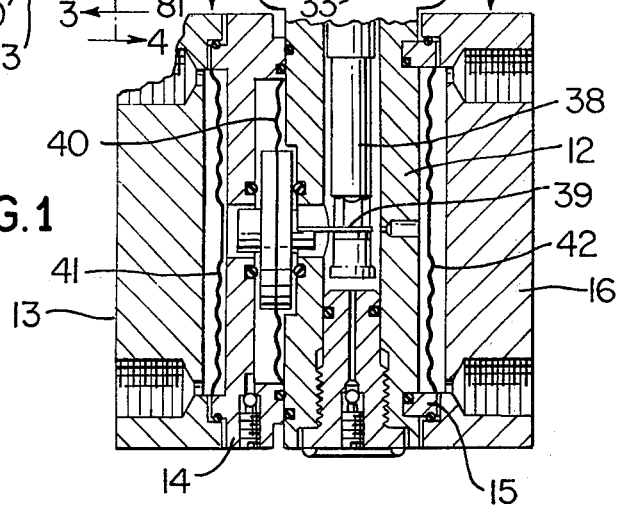
FIG. 2 is a further broken away cross-sectional view of part of the transmitter of FIG. 1 and illustrates the rebalance bellows or member thereof.
Figure 2:
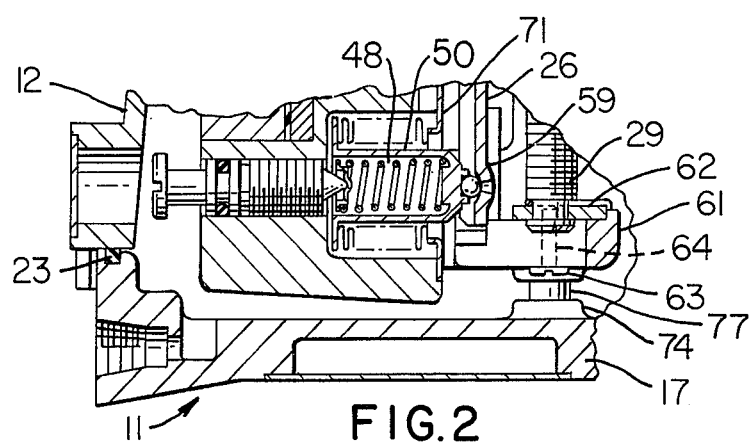
Figure 3:
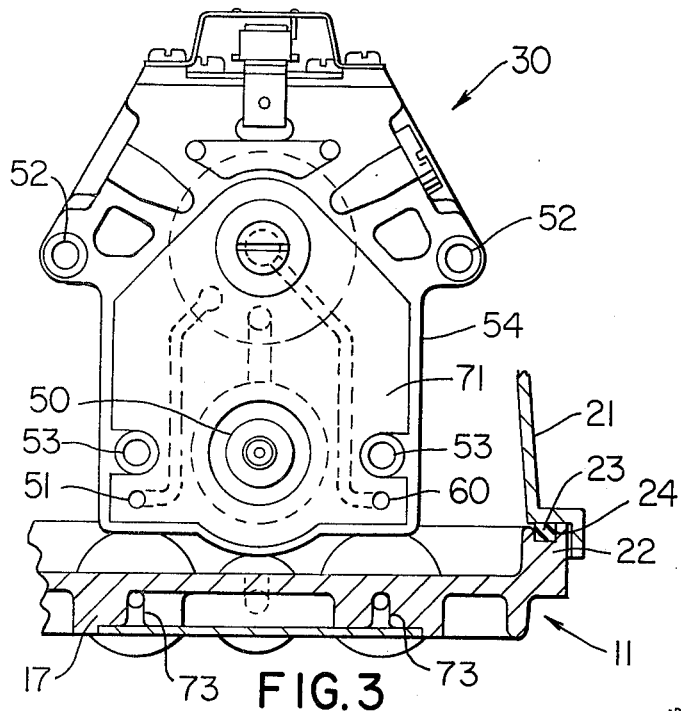
FIG. 3 is a fragmentary, cross-sectional view taken substantially on line 3—3 of FIG. 1.
Figure 4:
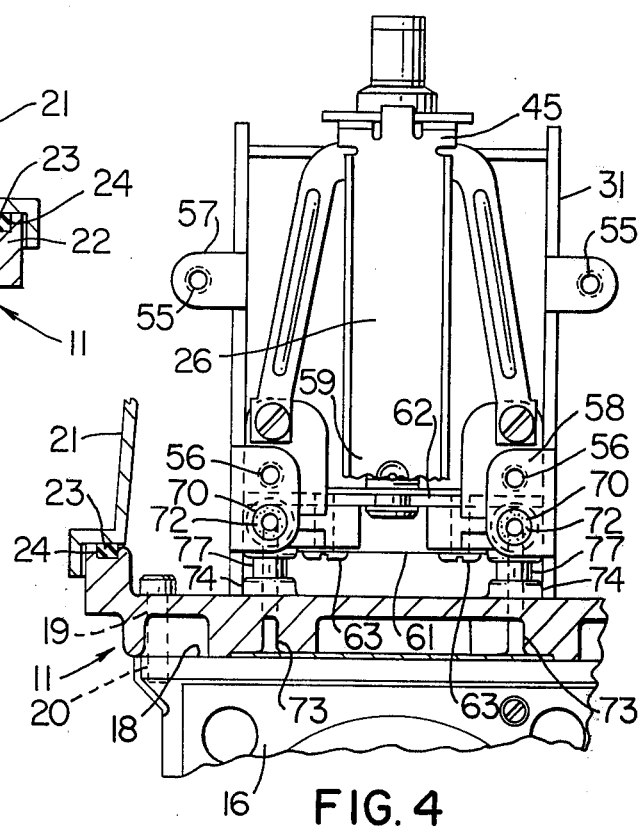
FIG. 4 is a fragmentary, cross-sectional view taken substantially on line 4—4 of FIG. 1.
Figure 5:
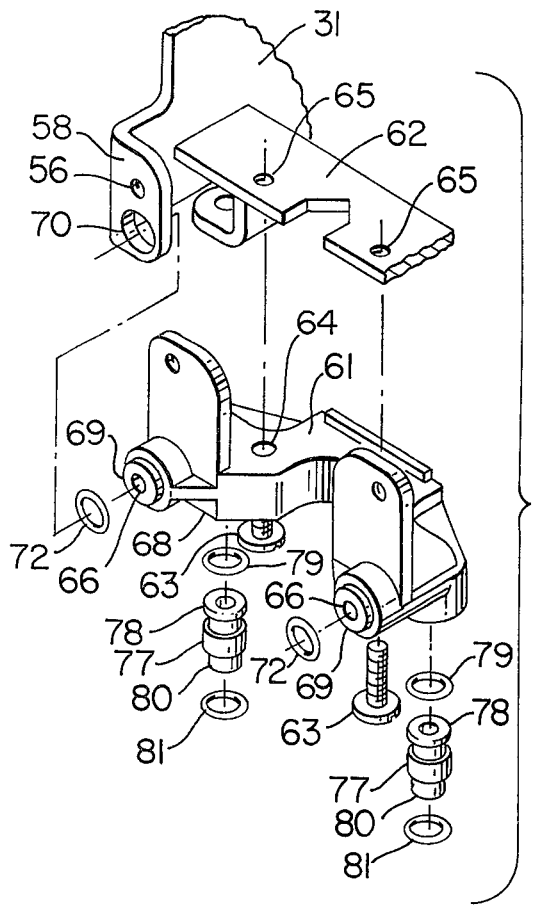
FIG. 5 is a partial front exploded perspective view of certain parts of the manifold and braket means illustrated in FIG. 4.
Figure 6:
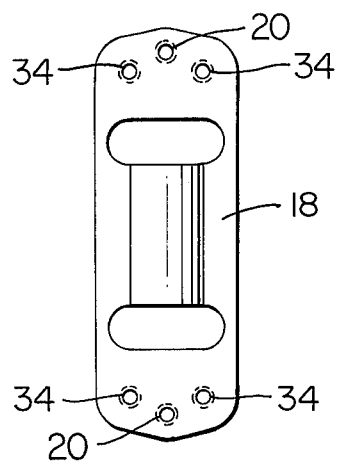
FIG. 6 is a fragmentary, cross-sectional view taken substantially on line 6—6 of FIG. 1 and illustrating the top of the main body of the base structure.
Figure 7:
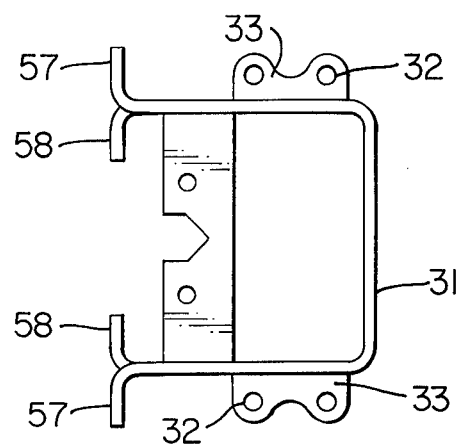
FIG. 7 is a fragmentary, cross-sectional view taken substantially on line 7—7 of FIG. 1 and illustrating the top of the base of the base structure.
Figure 8:
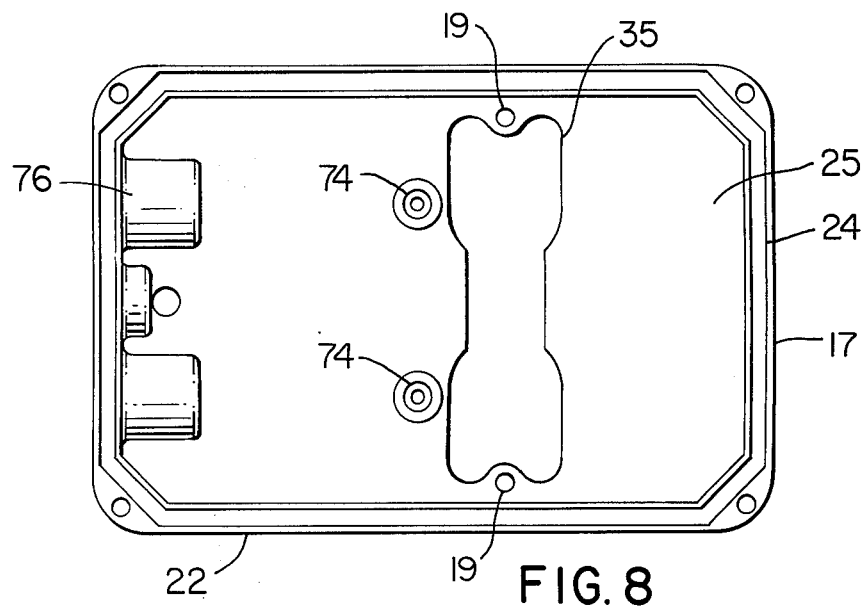
FIG. 8 is a fragmentary, cross-sectional view taken substantially on line 8—8 of FIG. 1 and illustrating the top of the bracket assembly for the secondary assembly.
Figure 9:
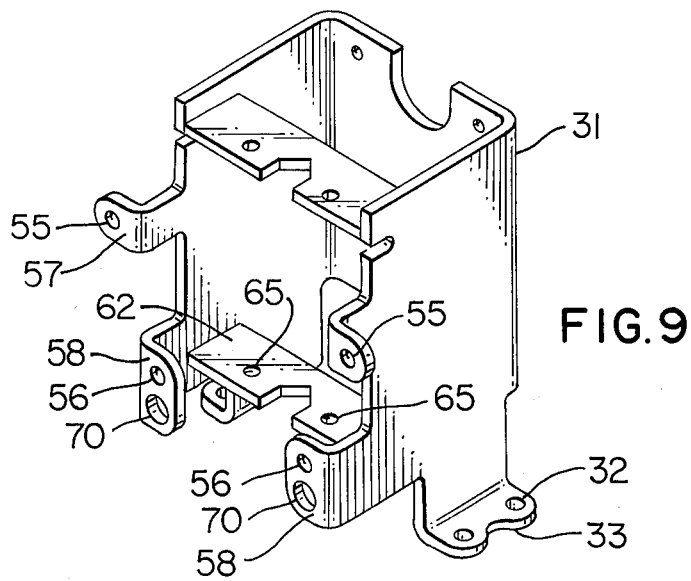
FIG. 9 is a front perspective view of the bracket assembly of FIG. 8.

While the various features of this invention are hereinafter described and illustrated as being particularly adapted for providing a force balance pneumatically operated transmitter, it is to be understood that the various features of this invention can be utilized singly or in any combination thereof to provide other devices as desired.

Therefore, this invention is not to be limited to only the embodiment illustrated in the drawings, because the drawings are merely utilized to illustrate one of the wide variety and uses of this invention.

Referring now to FIG. 1, the improved pneumatically operated force balance transmitter of this invention is generally indicated by the reference numeral 10 and comprises a base structure that is generally indicated by the reference number 11 and includes a main body 12 having a plurality of housing parts 13, 14, 15 and 16 secured thereto for a purpose as will be apparent hereinafter and a base 17 that is fastened to the top surface 18 of the main body 12 by threaded fastening members passing through openings 19 in the base 17 and being respectively received in threaded openings 20 formed in the top surface 18 of the main body 12.

A cover member or hood 21 is carried on the outer peripheral portion 22 of the base 17 and is sealed thereto by an annular sealing gasket 23 being received in an annular groove 24 in the top surface 25 of the base 17 as illustrated.

As is well known, a secondary lever 26 of the primary 12 is vertically suspended by a vertically disposed flexure leaf spring 27 and is adapted to pivot against an adjustable fulcrum member 28 carried on a rotatably mounted threaded rod 29 which is rotated to set the position of the fulcrum 28 relative to the secondary lever 26 so as to correlate the range of the pressure differential of the primary device 12 to the range of a pneumatically operated relay module 30 of the transmitter 10 that forms part of the secondary assembly thereof and is detachably secured in a manner hereinafter described to a bracket means 31 that also forms part of the secondary assembly and which is attached to the top surface 18 of the main body or primary 12 by threaded fastening members passing through opening 32 formed in bottom flange members 33 of the bracket 31 and being received in threaded opening 34 in the top surface 18 of the primary 12, such ears 33 fully fitting within a cutout 35 passing through the base 17 so that the base 17 is isolated from the bracket 31 and, thus, from the relay module 30.

The primary device for the body 12 has a primary lever means 36 pivotally mounted at 37 so that a lower end 38 thereof is interconnected by tying means 39 to a flexible diaphragm 40 which moves to the right or left depending upon a change in pressure acting against the outboard diaphragms 41 and 42 in a manner well known in the art.

The upper end 43 of the lever means 36 is interconnected by a tying means 44 to the secondary lever 26 at the upper end thereof so that movement of the diaphragm 40 upon changes in the pressure differential across the diaphragms 41 and 42 will cause pivotal movement of the secondary lever 26 about the fulcrum 28 with such pivotal movement of the secondary lever 26 being subsequently rebalanced by the relay module unit 30 as fully described in the aforementioned copending patent application so that all of the details of the relay module 30 need not hereinafter be set forth other than the general structure thereof that is necesary to understand the features of this invention.

For example, should the pressure on the diaphragm 42 increase over the pressure on the diaphragm 41, such pressure differential will cause the diaphragm 40 to move to the left in FIG. 1 and thereby cause the lever means 36 to pivot about its axis 37 in a clockwise direction and thereby cause corresponding clockwise pivotal movement of the secondary lever 26 about the fulcrum 28 so that the upper end 45 of the lever 26 causes a lever arrangement 46 to decrease the amount of fluid bleed through a pilot nozzle 47 so that the fluid pressure being delivered to a bellows chamber 48 from a relay valve means 49 increases and thus acts on a balance bellows means or member 50 to cause the same to move to the right with a greater force to tend to pivot the secondary lever 26 in a counter clockwise direction so that when the force of the pressure fluid in the chamber 48 has increased an amount to return the lever 26 to a true balanced or vertical condition thereof as illustrated in FIG. 1, such increase in pressure in the chamber 50 is maintained and the new value of the pressure fluid in the chamber 50 is directed out of a signal passage 51 of the module 30 to indicate that a new pressure differential condition is existing in the primary or main body 12. Conversely, a change in pressure differential causing the diaphragm 40 to move to the right in FIG. 1 and thereby pivot the lever means 36 in a counterclockwise direction and thus cause a counterclockwise pivoting of the secondary lever 26 and, thus, a greater opening of the pilot nozzle 47 to thereby cause a decrease in the pressure of the fluid in the loading chamber 48 of the bellows balance member 50 whereby the rebalance member 50 moves to the left to cause clockwise pivotal movement of the lever 26 interconnected thereto so that the lever 26 will be returned to its fully balanced or vertical condition. Such reduced pressure in the chamber 50 is now directed as a signal out of the outlet 51 to indicate the change in pressure differential now existing of the primary device 12.

As previously stated, the module 30 is adapted to be readily attached to and detached from the transmitter 10 by having threaded fastening members pass through suitable openings 52 and 53 in the housing means 54 of the module 30 and be received in threaded mating openings 55 and 56 formed respectively in ears 57 and 58 of the bracket means 31. Thus, when the module 30 is attached to the bracket means 31, the rebalance bellows members 50 will engage for securement purposes against the lower end 59 of the secondary lever 26 and the pilot nozzle 47 will be properly positioned against the lever arrangement 46 for the purpose previously described.

However, while the particular details of the module 30 for performing the rebalancing features previously set forth do not form a part of this invention, the means for supplying fluid pressure to an inlet passage 60 of the module 30 and receiving the pneumatic signal from the signal passage 51 thereof does provide a feature of this invention and comprises a fluid transfer member 61 adapted to be detachably secured to a cross-plate 62 of the bracket means 31 by threaded fastening members 63 passing through suitable openings 64 in the fluid transfer member 61 and being received in threaded openings 65 formed through the cross member 62 of the bracket means 31.

In this manner, the fluid transfer member 61 is detachably secured to the bracket 31 and has a pair of passages 66 formed therein respectively leading from a pair of cylindrical bores 67 at the lower surface 68 of the fluid transfer member 61 to a pair of cylindrical projections 69 that are adapted to pass into cooperating openings 70 formed in the ears 58 of the bracket 31 below the openings 56 thereof so that the cylindrical portions 69 are properly positioned by the ears 58 adjacent to the front surface 71 of the module 30 in the manner illustrated in FIG. 1 to respectively fluidly connect the passages 66 of the fluid transfer member 61 with the inlet passage 60 and the outlet passage 51. A pair of annular O-rings or other flexible sealing members 72 are respectively disposed in the openings 70 of the ears 58 of the bracket member 31 to be compressed between the cylindrical parts 69 of the fluid transfer member 61 and the surface 71 of the module 30 to fluid seal the passages 66 of the fluid transfer member 61 with the passages 60 and 51 of the module 30 even though the fluid transfer member 61 is not fastened directly to the module 30.

The base 17 has a pair of passages 73 provided therein and respectively leading from tubular projections 74 on the top surface 25 thereof to threaded ports 75 formed at the end 76 of the base 17 for attachment to suitable conduits and the like for respectively directing fluid pressure to and from the base 17 and, thus, to and from the module 30 through the fluid transfer member 61 in a manner now to be described.

A pair of tubular members 77 respectively have upper ends 78 provided with sealing O-rings 79 thereon and are slidingly disposed in the bores 67 in the lower surface 68 of the fluid transfer member 61 while the lower ends 80 of each tubular member 77 has sealing O-ring 81 thereon and is slidingly disposed in a respective tubular member 74 of the base 17 as illustrated in FIG. 1.

In this manner, it can be seen that the tubular members 77 are respectively disposed in sliding and sealing relation with the passages 73 of the base 17 and the passages 66 of the fluid transfer member 61 so that the fluid transfer member 61 is, in effect, floatingly interconnected to the base 17 by the tubular members 77 so that such floating arrangement tends to isolate any motion of the base 17 from the module 30 so that the secondary assembly of the module 30 and bracket means 43 will be substantially uninfluenced by any motion of the base 17 during the operation of the transmitter 10.

Thus, it can be seen that a defective relay module 30 can be readily detached from the bracket means 31 and the fluid transfer member 61 will still remain attached to the bracket means 31 to permit another module 30 to be secured to the bracket means 31 with the fluid transfer member 61 providing the fluid interconnection means for transmitting fluid to and from the base 17 to the replacing module 30 in the manner previously described while the fluid transfer member remains floatingly interconnected to the base 17 to isolate motion of the base 17 from the new module 30.

In particular, it is well known that force balance transmitters are very sensitive to forces applied to the secondary frame as these forces cause deflections of the structure which generate unwanted output pressure changes and signals. However, the tubular member 77 of the fluid transfer member 61 of this invention are free to slide and pivot in the base and fluid transfer member cavities to provide a certain degree of "universal joint" action and thereby prevent base deflections from being transferred to the fluid transfer member and, thus, to the module 30 and other parts of the secondary assembly.

Accordingly, the tubular connectors 77 and the fluid transfer member 61 isolate the secondary assembly from deflections of the base, provide a tubeless means of making pneumatic connection, compensate for misalignment of base to secondary, and provide for automatic pneumatic connection of the relay module when it is attached to the secondary frame.

Thus, it can be seen that this invention provides an improved pneumatically operated force balance transmitter and method of making the same.

While the form and method of the invention now preferred have been described and illustrated as required by the Patent Statutes, it is to be understood that other forms and methods can be utilized and still come within the scope of the appended claims.

What is claimed is:

1. In a force balance transmitter having a base structure provided with passage means and a secondary assembly attached thereto that includes a pneumatically operated relay module detachably secured to said secondary assembly and having passage means, the improvement comprising a fluid transfer member disposed between said module and said base structure and interconnecting said passage means of said base structure to said passage means of said module, said fluid transfer member being carried by said secondary assembly and being spaced from said base structure, said fluid transfer member having means floatingly interconnecting with said passage means of said base structure to tend to isolate motion of at least part of said base structure from said module, said fluid transfer member having passage means therein that interconnect said passage means of said base structure with said passage means of said module, said floating means of said fluid transfer member comprising tubular means slidingly disposed for axial and non-rotational movement in said passage means of said fluid transfer member and said passage means of said base structure whereby axial sliding movement can take place between said tubular means and said passage means of said fluid transfer member and said base member in the assembled relation of said force balance transmitter, said fluid transfer member being disposed in abutting relation with said module with said passage means of said fluid transfer member being in aligned relation with said passage means of said module, and annular sealing means being disposed in compressed relation between said module and said fluid transfer member to seal said passage means of said fluid transfer member to said passage means of said module, said secondary assembly including a bracket means and said base structure including a base and a main body, said bracket means and said base being mounted to said body, said base having said passage means of said base structure therein, said module and said fluid transfer member being detachably secured to said bracket means.

2. In a force balance transmitter having a base structure provided with passage means and a secondary assembly attached thereto that includes a pneumatically operated relay module detachably secured to said secondary assembly and having passage means, the improvement comprising a fluid transfer member disposed between said module and said base structure and interconnecting said passage means of said base structure to said passage means of said module, said fluid transfer member being carried by said secondary assembly and being spaced from said base structure, said fluid transfer member having means floatingly interconnecting with said passage means of said base structure to tend to isolate motion of at least part of said base structure from said module, said fluid transfer member having passage means therein that interconnect said passage means of said base structure with said passage means of said module, said floating means of said fluid transfer member comprising tubular means slidingly disposed for axial and non-rotational movement in said passage means of said fluid transfer member and said passage means of said base structure whereby axial sliding movement can take place between said tubular means and said passage means of said fluid transfer member and said base member in the assembled relation of said force balance transmitter, said secondary assembly incuding a bracket means and said base structure including a base and a main body, said bracket means and said base being mounted to said body, said base having said passage means of said base structure therein, said module and said fluid transfer members being detachably secured to said bracket means.

3. In a force balance transmitter as set forth in claim 2, the further improvement wherein said passage means of said base structure comprises a plurality of separate passages, said passage means of said module comprising a plurality of separate passages respectively interconnected to said passages of said base structure by said fluid transfer member.

4. In a method of making a force balance transmitter having a base structure provided with passage means and a secondary assembly attached thereto that includes a pneumatically operated relay module detachably secured to said secondary assembly and having passage means, the improvement comprising the steps of disposing a fluid transfer member between said module and said base structure, interconnecting said passage means of said base structure to said passage means of said module with said fluid transfer member, attaching said fluid transfer member to said secondary assembly so that said fluid transfer member is spaced from said base structure, floatingly interconnecting means of said fluid transfer member to said passage means of said base structure to tend to isolate motion of at least part of said base structure from said module, said fluid transfer member having passage means therein that interconnect said passage means of said base structure with said passage means of said module, said step of floatingly interconnecting means of said fluid transfer member comprising the step of slidingly disposing tubular means for axial and non-rotational movement in said passage means of said fluid transfer member and said passage means of said base structure whereby axial sliding movement can take place between said tubular means and said passage means of said fluid transfer member and said base member in the assembled relation of said force balance transmitter, disposing said fluid transfer member in abutting relation with said module with said passage means of said fluid transfer member being in aligned relation with said passage means of said module, disposing annular sealing means in compressed relation between said module and said fluid transfer member to seal said passage means of said fluid transfer member to said passage means of said module, said secondary assembly including a bracket means and said base structure including a base and a main body, mounting said bracket means and said base to said body, and detachably securing said module and said fluid transfer member to said bracket means.

5. In a method of making a force balance transmitter having a base structure provided with passage means and a secondary assembly attached thereto that includes a pneumatically operated relay module detachably secured to said secondary assembly and having passage means, the improvement comprising the steps of disposing a fluid transfer member between said module and said base structure, interconnecting said passage means of said base structure to said passage means of said module with said fluid transfer member, attaching said fluid transfer member to said secondary assembly so that said fluid transfer member is spaced from said base structure, floatingly interconnecting means of said fluid transfer member to said passage means of said base structure to tend to isolate motion of at least part of said base structure from said module, said fluid transfer member having passage means therein that interconnect said passage means of said base structure with said passage means of said module, said step of floatingly interconnecting means of said fluid transfer member comprising the step of slidingly disposing tubular means for axial and non-rotational movement in said passage means of said fluid transfer member and said passage means of said base structure whereby axial sliding movement can take place between said tubular means and said passage means of said fluid transfer member and said base member in the assembled relation of said force balance transmitter, said secondary assembly including a bracket means and said base structure including a base and a main body, mounting said bracket means and said base to said body, and detachably securing said module and said fluid transfer member to said bracket means.

6. In a method of making a force balance transmitter as set forth in claim 5, the further improvement comprising the steps of forming said passage means of said base structure from a plurality of separate passages, and forming said passage means of said module from a plurality of separate passages respectively interconnected to said passages of said base structure by said fluid transfer member.

* * * * *